(12) United States Patent
Zhang et al.

(10) Patent No.: US 10,037,253 B2
(45) Date of Patent: Jul. 31, 2018

(54) FAULT HANDLING METHODS IN A HOME SERVICE SYSTEM, AND ASSOCIATED HOUSEHOLD APPLIANCES AND SERVERS

(71) Applicant: Huizhou TCL Mobile Communication Co., Ltd., Huizhou, Guangdong (CN)

(72) Inventors: Yi Zhang, Guangdong (CN); Su Lu, Guangdong (CN); Teng Li, Guangdong (CN)

(73) Assignee: Huizhou TCL Mobile Communication Co., Ltd., Huizhou, Guangdong (CN)

( * ) Notice: Subject to any disclaimer, the term of this patent is extended or adjusted under 35 U.S.C. 154(b) by 129 days.

(21) Appl. No.: 15/107,060

(22) PCT Filed: Apr. 23, 2015

(86) PCT No.: PCT/CN2015/077278
§ 371 (c)(1),
(2) Date: Jun. 21, 2016

(87) PCT Pub. No.: WO2016/165157
PCT Pub. Date: Oct. 20, 2016

(65) Prior Publication Data
US 2017/0116094 A1    Apr. 27, 2017

(30) Foreign Application Priority Data
Apr. 13, 2015 (CN) .................. 2015 1 01735461

(51) Int. Cl.
G06F 11/00       (2006.01)
G06F 11/20       (2006.01)
G05B 19/042      (2006.01)

(52) U.S. Cl.
CPC ...... *G06F 11/2028* (2013.01); *G06F 11/2033* (2013.01); *G06F 11/2038* (2013.01); *G05B 19/042* (2013.01); *G05B 2219/2642* (2013.01)

(58) Field of Classification Search
CPC ............ G06F 11/2028; G06F 11/3688; G06F 11/3692
See application file for complete search history.

(56) References Cited

U.S. PATENT DOCUMENTS 8,060,779 B2 * 11/2011 Beardsley ........... G06F 11/2069
                                                         714/13
8,745,129 B2    6/2014 Wong et al.
(Continued)

FOREIGN PATENT DOCUMENTS

CN        1536811 A     10/2004
CN       101287001 A    10/2008
(Continued)

*Primary Examiner* — Jason B Bryan
(74) *Attorney, Agent, or Firm* — Andrew C. Cheng

(57) ABSTRACT

Fault handling methods in a home service system, and associated household appliances and servers are disclosed. According to a fault handling method, the household appliance may send a first message to a primary server, and may decide the primary server fails when not receiving a feedback connection signal from the primary server. The household appliance may then send a second message to a backup server according to pre-stored identification information of the backup server, so as to connect to the backup server. Thus, the household appliances can directly communicate with the backup server to establish connections thereto, eliminating the need of communications between the primary and the backup server, and no extra servers would be needed, which can reduce the cost, thereby avoiding the collapse of the entire home service system due to failure of the primary server.

7 Claims, 2 Drawing Sheets

(56) References Cited

U.S. PATENT DOCUMENTS

| | | | | |
|---|---|---|---|---|
| 2005/0138461 A1* | 6/2005 | Allen | .................. | G06F 11/2028 |
| | | | | 714/6.3 |
| 2009/0199046 A1* | 8/2009 | Arimilli | ................ | G06F 13/385 |
| | | | | 714/42 |
| 2009/0300406 A1 | 12/2009 | Katou et al. | | |
| 2012/0124431 A1* | 5/2012 | Bauer | ................ | H04L 41/0663 |
| | | | | 714/55 |
| 2012/0173611 A1 | 7/2012 | Wong et al. | | |
| 2013/0138998 A1* | 5/2013 | Ichikawa | ............ | G06F 11/2025 |
| | | | | 714/4.11 |
| 2015/0212909 A1* | 7/2015 | Sporel | ................ | G06F 11/2023 |
| | | | | 714/4.11 |

FOREIGN PATENT DOCUMENTS

| | | |
|---|---|---|
| CN | 102752209 A | 10/2012 |
| CN | 103825777 A | 2/2014 |

\* cited by examiner

FAULT HANDLING METHODS IN A HOME SERVICE SYSTEM, AND ASSOCIATED HOUSEHOLD APPLIANCES AND SERVERS

FIELD OF THE DISCLOSURE

The present disclosure relates to control and management technologies in smart home, and more particularly, to fault handling methods in a home service system, and associated household appliances and servers.

BACKGROUND OF THE DISCLOSURE

A main role of a home service system is to enable centralized and remote monitoring, control, and transactional management of a variety of home appliances through a server, in order to maintain harmony of the home environment. Thus, it is particularly important to ensure that occasional failures of the server, Which acts as the core of the home service system, won't affect the normal operation of the entire home service system.

A switchover mechanism is typically employed in the current industry to avoid the breakdown of the entire home service system, in case of server failures. To be specific, when it is found that a primary server collapses, a backup server will be switched to. There exist two solutions with this mechanism. The first one is that the primary server may synchronize the relevant data to the backup server and initiate a switchover request to the backup server, which may thus build up connections with household appliances when the backup server can function properly. The second one would be that both the primary and backup servers may send requests to a scheduling server, which may receive the requests, retrieve from a database a list of the primary and backup servers which initiate the requests, acquire from a web server the IP address of the primary server which is employed by default, and make a strategic decision as to whether employ the primary or backup server.

However, according to the first solution the backup server may need to send frequent fault detection messages to the primary server, which may cause a huge waste of resources; in addition, if the primary server is completely unable to work, then it cannot send the switchover request to the backup server, causing unavailability of the backup server. While according to the second solution an extra scheduling server would be required, which may inevitably increase the purchase cost; in addition, if the scheduling server collapses, the entire home service system would also break down.

SUMMARY OF THE DISCLOSURE

Fault handling methods in a home service system, together with associated household appliances and servers are disclosed, which aim at avoiding the breakdown of the entire home service system in case of server failure.

One technical solution employed by the disclosure is to provide a fault handling method in a home service system, where the home service system may comprise at least one household appliance, a primary and a backup server which connect to and control the at least one household appliance. The method may comprise: sending, by the at least one household appliance, a first message to the primary server, and determining the primary server fails when not receiving a feedback connection signal from the primary server; and sending, by the at least one household appliance, a second message to the backup server according to pre-stored identification information of the backup server, and connecting to the backup server accordingly.

The block of the at least one household appliance connecting to the backup server may comprise: responding, by the backup server, to the second message, to establish a connection with the at least one household appliance according to pre-stored registration information of the at least one household appliance.

The condition that the at least one household appliance doesn't receive the feedback connection signal from the primary server may comprise: the at least one household appliance doesn't receive the feedback connection signal within a predefined first time threshold value and/or predefined connection on times.

The at least one household appliance may, when the primary server functions properly and is in a control connection with the at least one household appliance, receive from the primary server and store the identification information of the backup server. Or, when the backup is set up for the first time and has been connected to the at least one household appliance, the at least one household appliance may receive from the backup server and store the identification information of the backup server.

The primary server may send an informing message to the at least one household appliance and/or to the backup server when it has removed its fault, to inform that it is back to normal operation. The primary server may then connect to the at least one household appliance.

The method may further comprise, when the primary server has been connected to the at least one household appliance: disconnecting the at least one household appliance from the backup server; or, maintaining the connection between the at least one household appliance and the backup server, and, when the at least one household appliance receives within a second time threshold value a control command from the primary and the backup server, respectively, executing only the control command from the primary server and discarding the one from the backup server.

The backup server may perform state switch based on a type of an identification code contained in the second message or the informing message. Specifically, when the identification code is of a first type, the backup server may switch to a working state; when it is of a second type, the backup server may switch to an idle state; and when no identification code is present in the second message or the informing message, the backup server may discard the second message and the informing message.

Another technical solution employed by the disclosure is to provide a household appliance, which is connected to and controlled by a primary and a backup server. The household appliance may comprise: a transceiving module configured to send to the primary server a first message to build up a connection thereto, and configured to receive identification information of the backup server; a storage module configured to store the identification information of the backup server; a determination module configured to decide the primary server fails when the transceiving module doesn't receive a feedback connection signal from the primary server; and a processing module configured to, when the determination module decides the primary server malfunctions, control the transceiving module to send a second message to the backup server according to the identification information of the backup server stored in the storage module, to establish a connection with the backup server.

The household appliance may further comprise a timer/counter module. If the transceiving module doesn't receive the feedback connection signal from the primary server within a first time threshold value and/or connection times set by the timer/counter module, then the determination module may decide that the primary server fails.

When the determination module decides that the primary server functions properly and is in a control connection with the household appliance, the transceiving module may receive from the primary server the identification information of the backup server. Or, when the backup server is set up for the first time and has been connected to the household appliance, the transceiving module may receive from the backup server its identification information.

The transceiving module may further receive an informing message from the primary server when the primary server has removed its fault. The processing module may control the household appliance to connect to the primary server according to the informing message.

The household appliance may further comprise a timer/counter module. When the primary server is in a connection to the household appliance, the processing module may further control the household appliance, to disconnect from the backup server, or the processing module may control the household appliance to maintain its connection with the backup server, and if the transceiving module receives, within a second time threshold value and/or connection times set by the timer/counter module, a control command from the primary and the backup server, respectively, the processing module may execute only the control command from the primary server, while discarding the one from the backup server.

The second message may contain an identification code, according to which the backup server may switch to a working state.

Yet another technical solution adopted by the disclosure is to provide a server for a home service system, used to control at least one household appliance in the home service system. The server may comprise: a storage module configured to store registration information of the at least one household appliance; and a response module configured to respond to a message from the at least one household appliance, to build up a connection to the at least one household appliance according to the registration information of the at least one household appliance.

The response module may perform state switch based on a type of an identification code contained in the message from the at least one household appliance. Specifically, when the identification code is a first type, the server may switch to a working state; when it is of a second type, the server may switch to an idle state; and when no identification code is present in the message, the server may discard the message.

Advantages of the present disclosure may follow. According to present disclosure, the household appliances can directly communicate and thus establish connections with the backup server, eliminating the need of communications between the primary server and the backup server, in addition, no extra servers would be needed, which can reduce the cost, thereby the collapse of the entire home service system can be avoided.

DETAILED DESCRIPTION OF THE DISCLOSURE

Hereinafter technical solutions of the disclosure will be described in definite and comprehensive details with reference to the accompanying drawings. Obviously, the embodiments described below are only some but not all the embodiments of the disclosure. All other embodiments acquired by those of ordinary skill in the art based on the embodiments of the present disclosure without making inventive efforts shall all fall within the protection of the present disclosure.

Figure 1:
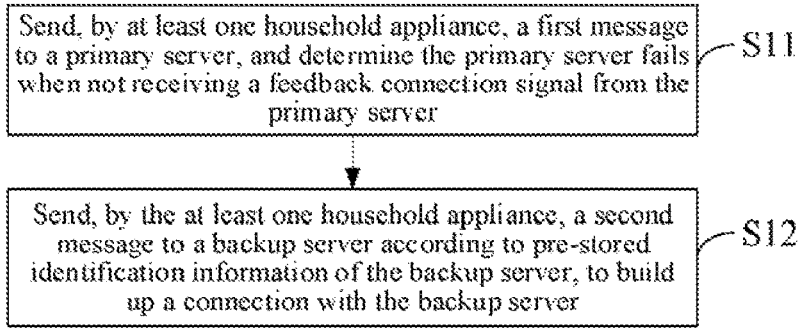
FIG. 1 shows a flowchart illustrating a fault handling method in a home service system according to an embodiment of the disclosure.

FIG. 1 is a flowchart of a fault handling method in a home service system according to an embodiment, which can avoid the breakdown of the home service system employing a switchover mechanism due to fault of a primary server. The home service system may comprise at least one household appliance, a primary server, and a backup server. The primary and the backup server can be two physically separated devices, or two working modes of a same device. Both the primary and backup servers can monitor and control one or more household appliances connected to a home network. Depending on the remote or short-range requirements, the home network may comprise at least a network built up based on telecommunication technology. If, however, only near-field requirements need to be satisfied, the home network can comprise only the network established based on near-field communication technology.

Referring to FIG. 1, the fault handling method may comprise the following steps.

In a first step S11, the at least one household appliance may send a first message to the primary server. When the at least one household appliance doesn't receive a feedback connection signal from the primary server, the primary server may be determined to have a breakdown.

The first message may be in effect a connection request.

The at least one household appliance can determine whether the primary server malfunctions depending on whether it receives the feedback connection signal from the primary server within a predetermined time threshold value. More specifically, if the at least one household appliance receives within the predetermined first time threshold value a feedback signal from the primary server in response to the connection request, it may decide the primary server functions properly; otherwise if the at least one household appliance doesn't receive any feedback signal from the primary server within the predetermined first time threshold value, or receive a feedback signal which doesn't correspond to the connection request, then it may decide the primary server malfunctions.

The at least one household appliance can also determine whether the primary server malfunctions depending on whether it receives the feedback connection signal from the primary server within a predetermined connection times. More specifically, if the at least one household appliance receives within the predetermined connection times a feedback signal from the primary server in response to the connection request, it may decide the primary server functions properly; otherwise if the at least one household appliance doesn't receive any feedback signal from the primary server within the predetermined connection times, or receive a feedback signal which doesn't correspond to the connection request, then it may decide the primary server malfunctions.

The at least one household appliance can also determine whether the primary server malfunctions depending on whether it receives the feedback connection signal from the primary server based on a combination of the predetermined time threshold value and connection times. For example, the at least one household appliance may initialize its timer T to be "0", and its counter N to be "0", i.e., T=0 and N=0. The at least one household appliance may then initiate a connection request to the primary server, when the timer is started. If within a first time threshold value $T_{max1}$ since sending the connection request, a corresponding feedback signal is received from the primary server, it may indicate the primary server functions properly, when both the timer and counter will be reset to "0" to be prepared for next fault detection. If within the first time threshold value $T_{max1}$ after sending the connection request, no feedback signals are received from the primary server, it may be further determined whether the times of the at least one household appliance sending the connection requests reach the maximum threshold value whether $N=N_{max}$. If $N<N_{max}$, the household appliance may repeat sending connection requests to the primary server until $N=N_{max}$; and when $N=N_{max}$, the household appliance may send a second message to the backup server.

The above determination is based on the connection conditions between the at least one household appliance and the primary server to decide whether the primary server fails, but not on the prior art method of mutual detection between the primary server and the backup server. Thus, the determination method according to the disclosure can reduce the frequency of the backup server monitoring the primary server, and the backup server may start working only after receiving the second message from the household appliance. In particular, when the backup server uses a battery as power supply, the above determination method can significantly reduce the power consumption of the backup server, and thus can extend the battery life time of the backup server. The method may continue to step S12.

In the following step S12, the at least one household appliance may send a second message to the backup server according to pre-stored identification information of the backup server, in order to connect the backup server to the at least one household appliance.

The identification information can be a unique identifier specifying, the identity of the backup server.

Likewise, both the backup server and the primary server can store the registration information of the at least one household appliance in the form of a table, which may comprise the identities, names, calling methods, connection paths, and so on. Both the registration information and the identification information are essential information when the at least one household appliance builds up connections with the backup server or primary server.

The at least one household appliance can obtain the identification information of the backup server by two ways.

By the first way, the primary server may establish a control connection with the at least one household appliance when no fault occurs. The primary server may communicate with the at least one household appliance, which means it may inform not only its own identification information, but also the identification information of the backup server to the at least one household appliance, which may thus store the informed identification information.

By the second way, when the backup server is set up for the first time and has built up a connection with the at least one household appliance, the at least one household appliance may write its registration information to the backup server, which may then inform its identification information to the at least one household appliance, after which the backup server may switch to an idle state.

As a result, the at least one household appliance may simultaneously store the identification information (e.g., ID) of the backup server and the primary server, but it may use only the identification information of the backup server.

The backup server may respond to the second message after receiving it, and thus connect to the at least one household appliance according to the pre-stored registration information of the at least one household appliance. The backup server can switch between "on" (working state) and "off" (idle state) based on a type of an identification code contained in the second message (as well as the informing message discussed below). For example, when the identification code is of a first type, such as "1", the backup server may switch to the working state, when the identification code is of a second type, such as "0", the backup server may switch to the idle state; when no identification codes are present in the second message, the backup server may discard the second message, and perform no switches.

To conclude based on the above description, the household appliances can directly communicate with the backup server to establish connections with the backup server, eliminating the need of communications between the primary and the backup server, in addition, no extra servers would be needed, which can reduce the cost, thereby the collapse of the entire home service system due to failure of the primary server can be effectively avoided.

In addition, the communications between the servers (including the primary server and the backup server) and the household appliances are not conducted all the time. In order to save energy, the servers and the household appliances may exchange information at fixed appointed times. To enable the backup server to obtain the appointed times for communication with the household appliances, the backup server can synchronize information with the primary server at a fixed appointed time on a daily basis, so as to acquire a time table stored by the primary server for communication with the household appliances, thus the backup server can know when to communicate with the household appliances right after startup. If the primary server fails before the appointed time point, causing the information on that day cannot be synchronized, then the backup server can use information acquired from the primary server in the previous day as a basis for communication with the household appliances.

Further, the backup server may build up a connection with the at least one household appliance after receiving an enabling command (the second message), and may exchange information with the at least one household appliance at the appointed times before the recovery of the primary server.

Figure 2:
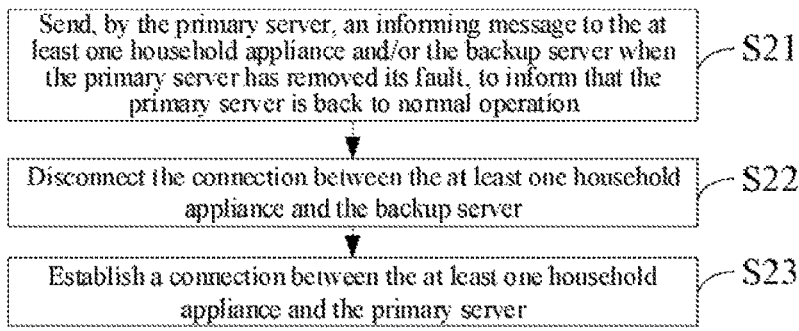
FIG. 2 shows a flowchart illustrating a fault handling method in a home service system according to another embodiment of the disclosure.

FIG. 2 is a flowchart illustrating a fault handling method in a home service system according to another embodiment, which can be applied to the case where the primary server has successfully removed its fault and is back to normal. Referring now to FIG. 2, in the present embodiment the fault handling method may further comprise the following steps after the step S12 shown in FIG. 1.

In a first subsequent step S21, the primary server may, after removing its fault, send an informing message to the at least one household appliance and/or the backup server, to inform that the primary server can currently work properly.

In the next subsequent step S22, the connection between the at least one household appliance and the backup server can be disconnected.

In the next subsequent step S23, the at least one household appliance may establish a connection with the primary server.

Figure 3:
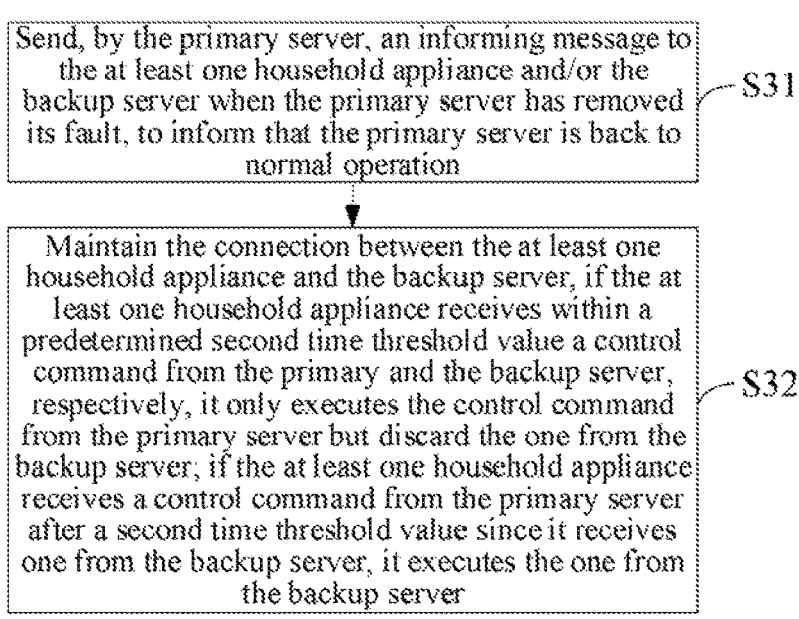
FIG. 3 shows a flowchart illustrating a fault handling method in a home service system according to yet another embodiment of the disclosure.

Differing from the arrangement shown in FIG. 2, the connections between the at least one household appliance and the backup server may not be disconnected but be maintained when the primary server can function properly, which may imply that the at least one household appliance can be connected both to the primary server and to the backup server, referring now to the embodiment shown in FIG. 3, which may comprise the following steps.

In the first subsequent step S31, the primary server may, after removing its fault, send an informing message to the at least one household appliance and/or to the backup server, to inform that the primary server can currently work properly. The method may then proceed to step S32.

In the next step S32, the connection between the at least one household appliance and the backup server may be maintained. If within a predetermined second time threshold value (differing from the first time threshold value discussed above used to determine whether the primary server malfunctions) the at least one household appliance receives a control command from the primary server and the backup server, respectively, it may execute only the control command from the primary server, while discard the one from the backup server; if the at least one household appliance receives a control command from the primary server beyond the second time threshold value since it receives one from the backup server, then it may execute the control command from the backup server.

The current embodiment can be applied to the use case in which the primary server and the backup server belong to different physical devices or the two are relatively distant from each other, to further enhance the user experience.

Figure 4:
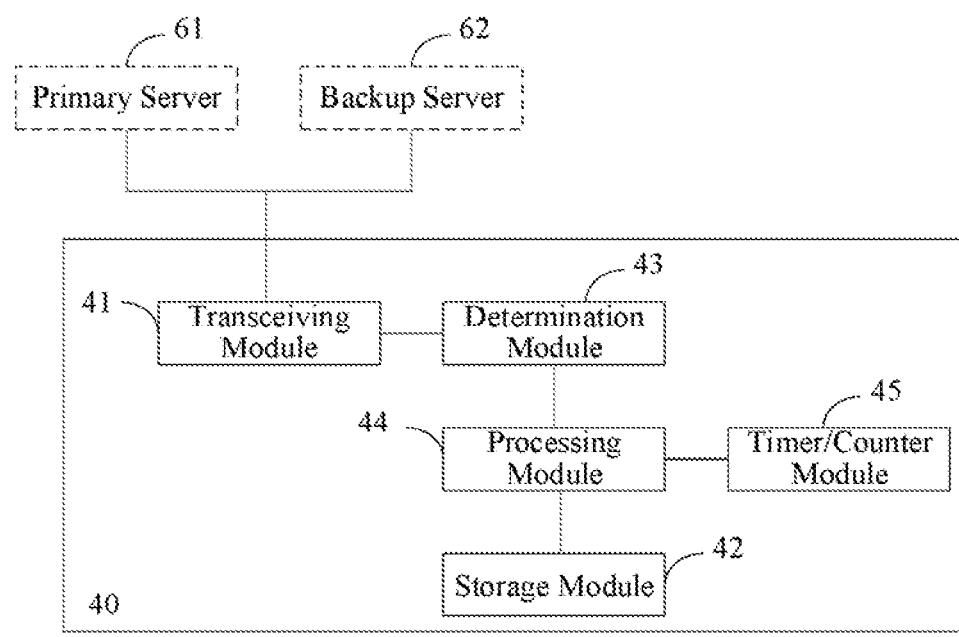
FIG. 4 shows a block diagram of a household appliance according to an embodiment of the disclosure.

FIG. 4 shows a block diagram of a household appliance, according to an embodiment. Referring to FIG. 4, the household appliance 40 according to the current embodiment may comprise a transceiving module 41, a storage module 42, a determination module 43, and a processing module 44.

The transceiving module 41 may be configured to send a first message to the primary server 61 to build up a connection thereto.

The determination module 43 may be configured to, when the transceiving module 41 does not receive a feedback connection signal from the primary server, decide the primary server 61 malfunctions. More specifically, the determination module 43 can decide whether the processing module 44 malfunctions depending on whether it receives the feedback connection signal from the processing module 44 within a predetermined time threshold value and/or predetermined connection times. For example, if the transceiving module 41 doesn't receive the feedback connection signal from the primary server 61 within a first time threshold value and/or connection times predefined by a timer/counter module 45, then it may decide the primary server malfunctions.

The above determination is based on the connection conditions between the at least one household appliance 40 and the primary server 61 to decide whether the primary server 61 fails, but not on the prior art method of mutual detection between the primary server 61 and the backup server 62. Thus, the determination method according to the disclosure can reduce the frequency of the backup server 62 monitoring the primary server 61, and the backup server 62 may start working only after receiving the second message from the transceiving module 41. In particular, when the backup server 62 uses a battery as power supply, the above determination method can significantly reduce the power consumption of the backup server 62, and thus can extend the battery life time of the backup server 62.

The transceiving module 41 may further be configured to receive identification information of the backup server 62. The identification information can be a unique identifier specifying the identity of the backup server 62. The transceiving module 41 can obtain the identification information of the backup server 62 by two ways. By the first way, when the determination module 43 decides that the primary server 61 functions properly and is in a control connection with the at least one household appliance 40, the transceiving module 41 can receive from the primary server 61 the identification information of the backup server 62. In the second way, when the backup server 62 is set up for the first time and has established a connection with the at least one household appliance 40, the at least one household appliance 40 may write its registration information to the backup server 62, and the backup server 62 can inform form its identification information to the transceiving module 41, after which the backup server 62 will switch to the idle state.

By the second way, the backup server 62 can directly inform its identification information to the at least one household appliance 40, and the backup server 62 may have stored in advance the registration information of the at least one household appliance 40, thus when the backup server 62 is switched to, it needs not to again register the at least one household appliance 40, which can significantly reduce the information exchange therebetween.

The storage module 42 may be configured to store the identification information of the backup server 62.

The processing module 44 ma be configured to decide, according to the determination of the determination module 43, whether to send a second message to the backup server 62 to establish a connection. Specifically, when the determination module 43 decides the primary server 61 malfunctions, the processing module 44 may control the transceiving module 41 to send a second message to the backup server 62 according to the identification information of the backup server 62 that is stored in the storage module 42, so as to connect the backup server 62. The second message may contain an identification code, according to which the backup server 62 may switch to a working state.

After the connection has been built up between the backup server 62 and the at least one household appliance 40, the transceiving module 41 may further be configured to receive an informing message from the primary server 61 when the primary server 61 has removed its fault. The processing module 44 may control the transceiving module 41 to establish a connection between the at least one household appliance 40 and the primary server 61, according to the informing message.

Furthermore, when the connection has been established between the at least one household appliance 40 and the primary server 61, the processing module 44 may control the transceiving module 41 to disconnect or maintain the connection between the at least one household appliance 40 and the backup server 62. If within a second time threshold value (differing from the first time threshold value discussed above used to determine whether the primary server 61 malfunctions) set by the timer/counter module 45 the transceiving module 41 receives a control command from the primary server 61 and the backup server 62, respectively, the processing module 44 may execute only the control command from the primary server 61, while discard the one from the backup server 62.

Figure 5:
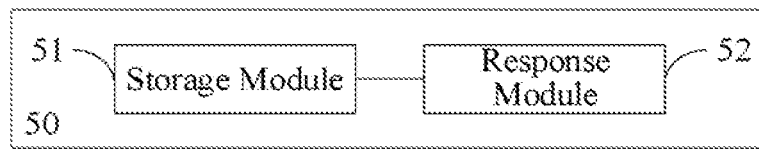
FIG. 5 shows a block diagram of a server according to an embodiment of the disclosure.

FIG. 5 shows a block diagram of a server according to an embodiment of the disclosure. The server 50 may be configured to control at least one household appliance 40 in a home service system, and may comprise a storage module 51 and a response module 52.

The storage module 51 may be configured to store registration information of the at least one household appliance 40.

The response nodule 52 may be configured to respond to a message from the at least one household appliance 40, and thus to establish a connection with the at least one household appliance 40 according to the stored registration information of the at least one household appliance 40.

Specifically, the response module 52 may perform state switch based on a type of an identification code contained in the message from the at least one household appliance For example, when the identification code is of a first type, the server 50 may switch to a working state; when it is of a second type, the server 50 may switch to an idle state; and when no identification code is present in the message, the server 50 may discard the message.

A home service system is also disclosed, comprising at least one household appliance 40 and servers 50 which can build up a control connection with the at least one household appliance 40.

In the current embodiment, the at least one household appliance 40, the servers 50 (including the primary server 61 and backup server 62), and other various modules in the home service system can perform the corresponding blocks of the fault handling methods shown in FIGS. 1-3, and thus may achieve the same advantages therewith.

Note, the at least one household appliance 40, the servers 50, and the home service system are merely illustrative, for example, the division of modules or units is only a division based on logic functions, thus in actual implementations there may be other division manners, for example, multiple units or components may be combined or integrated into another system, or some features may be ignored or not executed. The connections between various modules can be achieved through interfaces, or can be achieved electrically or in other forms.

The various functional modules, as constituent parts of the at least one household appliance 40, the servers 50, and the home service system, can be physical blocks, can be co-located or distributed to multiple network units, and can be implemented as hardware or as software functional blocks. Those of skill in the art can select part or all of the modules according to actual requirements, to achieve the objectives of solutions of the present disclosure.

The above description is merely some exemplary embodiments of the disclosure, but is not meant to limit the scope of the disclosure. Any equivalent structures or flow transformations made to the disclosure, or any direct or indirect applications of the disclosure on other related fields, shall all be covered within the protection of the disclosure.

The invention claimed is:

1. A fault handling method in a home service system, where the home service system comprises at least one household appliance, and a primary and a backup server connecting to and controlling the at least one household appliance, the method comprising:

sending, by the at least one household appliance, a first message to the primary server, and determining that the primary server fails when the at least one household appliance does not receive a feedback connection signal from the primary server; and sending, by the at least one household appliance, a second message to the backup server according to pre-stored identification information of the backup server, to establish a connection with the backup server;

sending, by the primary server, an informing message to the at least one household appliance, the backup server, or to any combination thereof when the primary server has removed its fault, to inform that the primary server is back to normal operation; and establishing, by the primary server, a connection with the at least one household appliance;

when the primary server has been connected to the at least one household appliance:

maintaining the connection between the at least one household appliance and the backup server, and when the at least one household appliance receives within a time threshold value a control command from the primary and the backup server, respectively, executing only the control command from the primary server and discarding the one from the backup server; when the at least one household appliance receives a control command from the primary server beyond the time threshold value since it receives one from the backup server, executing the control command from the backup server.

2. The fault handling method according to claim 1, wherein the at least one household appliance establishing the connection with the backup server comprises:

responding, by the backup server, to the second message, and connecting to the at least one household appliance according to pre-stored registration information of the at least one household appliance.

3. The fault handling method according to claim 1, wherein the condition that the at least one household appliance does not receive the feedback connection signal from the primary server comprises:

the at least one household appliance does not receive the feedback connection signal from the primary server within at least one of a predetermined first time threshold value and predetermined connection times.

4. The fault handling method according to claim 1, wherein when the primary server functions properly and is in a control connection with the at least one household appliance, the at least one household appliance receives from the primary server and stores the identification information of the backup server; or, when the backup server is set up for a first time and has been connected to the at least one household appliance, the at least one household appliance receives from the backup server and stores the identification information of the backup server.

5. The fault handling method according to claim 1, wherein the backup server performs state switch based on a type of an identification code contained in the second message, wherein when the identification code is of a first type, the backup server switches to a working state; when the identification code is of a second type, the backup server switches to an idle state; and when no identification code is present in the second message, the backup server discards the second message.

6. The fault handling method according to claim 1, wherein the backup server performs state switch based on a type of an identification code contained in the informing message, wherein when the identification code is of a first type, the backup server switches to a working state; when the identification code is of a second type, the backup server switches to an idle state; and when no identification code is present in the informing message, the backup server discards the informing message.

7. The fault handling method according to claim 1, further comprising:
   synchronizing, by the backup server, informations with the primary server at a fixed appointed time on a daily basis to acquire a time table stored by the primary server for communication with the household appliances.

* * * * *